United States Patent [19]

Davis

[11] Patent Number: 4,927,167

[45] Date of Patent: May 22, 1990

[54] AMBULATORY WHEELSTAND

[76] Inventor: Daniel W. Davis, 1367 Merle Ave., Burton, Mich. 48509

[21] Appl. No.: 171,678

[22] Filed: Mar. 21, 1988

[51] Int. Cl.[5] .......... B62M 1/14

[52] U.S. Cl. .......... 280/250.1; 5/62; 280/304.1; 280/291; 297/423; 297/DIG. 10

[58] Field of Search ... 280/242 R, 242 WC, 289 WC, 280/291; 297/DIG. 4, DIG. 10, 423; 5/62; 248/242, 240, 240.4; 180/90.6

[56] References Cited

U.S. PATENT DOCUMENTS

| | | | |
|---|---|---|---|
| 1,106,693 | 8/1914 | Wranau | 248/240.4 |
| 1,487,495 | 3/1924 | Germeten et al. | 297/423 |
| 2,003,844 | 6/1935 | Tintner | 403/97 |
| 2,095,411 | 10/1937 | Everest et al. | 280/242 WC |
| 2,295,006 | 9/1942 | Philips | 5/62 |
| 2,572,149 | 10/1951 | Hind et al. | 297/DIG. 10 |
| 2,986,200 | 5/1961 | Nobile | 297/DIG. 4 |
| 3,089,692 | 5/1963 | Blomqvist | 5/62 |
| 3,216,738 | 11/1965 | Bockus | 297/DIG. 4 |
| 3,249,368 | 5/1966 | Ginzburg | 280/242 R |
| 3,405,954 | 10/1968 | Wolfe | 297/DIG. 4 |
| 3,618,968 | 11/1971 | Greer | 297/DIG. 4 |
| 3,848,883 | 11/1974 | Breacain | 297/DIG. 4 |
| 4,310,167 | 1/1982 | McLaurin | 280/242 WC |
| 4,326,732 | 4/1982 | Gall et al. | 280/242 WC |
| 4,620,714 | 11/1986 | Davis | 280/242 R |
| 4,685,693 | 8/1987 | Vadjunec | 5/61 |
| 4,744,578 | 5/1988 | Stearns | 280/242 WC |

*Primary Examiner*—David M. Mitchell
*Assistant Examiner*—Karin Tyson
*Attorney, Agent, or Firm*—Gifford, Groh, Sprinkle, Patmore and Anderson

[57] ABSTRACT

Am ambulatory wheelstand includes a user support structure pivotably attached to a wheeled frame. The frame includes a pair of larger diameter drive wheels and a pair of front castor wheels. The user support structure includes hinge pins which are entrained in elongated horizontal slots in the frame. A pivot arm also connects the support structure to the frame so that the structure can pivot between an upright and a prone position. As the support structure is lowered to a prone position, the hinge pin slides rearwardly in the elongated slot to prevent the center of gravity from shifting too far forward. Conversely, when in the upright position, the hinge pin slides to the forward end of the slot, maintaining the center of gravity in substantially the same position.

20 Claims, 3 Drawing Sheets

AMBULATORY WHEELSTAND

BACKGROUND OF THE INVENTION

I. Field of the Invention

This invention relates to ambulatory devices for physically handicapped individuals and, in particular, to an ambulatory wheelstand having multiple angular positions in which the center of gravity of the user remains centrally disposed above a particular location on the wheelstand frame.

II. Description of the Prior Art

Ambulatory devices have been used to enable a non-ambulatory person, such as a paraplegic or a quadraplegic, to move about more or less on his own. Typical wheelchairs were the first types of ambulatory devices, but required the user to remain in one position, thus causing atrophy of the muscles.

Wheelstands first resembled a cross between a wheelchair and a gurney and employed a foldable or a pivotable stretcher portion which could pivot between a horizontal and an upright position. Examples of these earlier wheelstands can be found in U.S. Pat. Nos. 2,295,006 to Philips and 2,986,200 to Nobile. Each of these patents discloses a device having a large central driving wheel rotatably attached to a frame stabilized by castor wheels at the front and the rear of the device. The patient support is pivotably secured to the frame and includes either a straight stretcher or a somewhat chair-shaped platform to support the user. The support is pivotable between an upright position and a horizontal position. Because of the relatively high pivoting point of the support structure of these devices, the center of gravity of the devices is quite high, rendering the device somewhat unstable. The front and rear castor wheels are required to improve stability.

An improved ambulatory wheelstand is disclosed in U.S. Pat. No. 4,620,714 to Davis.

U.S. Pat. No. 4,310,167 to McLaurin disclosed what the inventor calls a center of gravity wheelchair with an articulated chassis. This wheelchair also has a large drive wheel centrally located and both front and rear castor wheels. The chassis is articulated so that the user can shift the center of gravity of the device forward by operation of a lever which extends the chassis frame and the front castor wheel, thus elongating the frame and improving the stability. This device is particularly useful for negotiating curbs, hills or the like. However, McLaurin still employs front and rear castors and requires the user to assume a sitting position only.

SUMMARY OF THE PRESENT INVENTION

These and other disadvantages are overcome by the present invention which discloses an ambulatory wheelstand having only front castors and in which the center of gravity remains distributed above one central location on the frame. The wheelstand comprises a frame including a pair of lateral supports or rails in spaced, parallel arrangment with front and intermediate cross supports extending between the lateral supports. A pair of large drive wheels are rotatably secured at the rear end of the lateral supports and a pair of castor wheels are secured to the front end of the lateral supports. A user support structure comprising a pair of elongated rails spanned at one end by a chest plate, and at the other end by a foot plate, is pivotably secured to the lateral supports for pivoting between at least an upright or vertical position and a prone or horizontal position. The user support structure may also include a thigh plate and a leg wedge and all of the support plates may be padded for user comfort.

The novelty of the present invention lies in its improved pivoting mechanism which greatly enhances the stability of the device. The stability of a wheelstand of this type depends on the position of the center of gravity of the device combined with its user. The center of gravity is ideally located as close to the ground as possible and, with respect to the front and the rear of the frame, should be located between the drive wheels and the castor wheels, but closer to the drive wheels than to the castor wheels. In the previously known wheelstands, when the user support was shifted from the upright to the prone position, the center of gravity was shifted from the rearward position over the drive wheels forward to a position much closer to the front castor wheels, thus putting undue stress on the castor wheels rendering the wheelstand unstable.

In the present invention, however, the center of gravity does not move forward to the same extent as in previous devices when the user support is shifted from the upright to the prone position. Instead, the center of gravity remains distributed over substantially the same location of the frame regardless of the position of the user support. This is accomplished by sliding the user support structure rearwardly as it is pivoted from the upright to the prone position. An elongated slot is provided for this purpose in each of the lateral supports, preferably formed in a block portion spaced above the lateral support. Hinge pins secured to the elongated rails of the user support structure are slidably entrained in the slots. A pivot arm is secured at a first end to an intermediate cross support forward of the elongated slot, and at a second end is pivotably secured to the user support structure. In the upright position of the user support structure, the hinge pin is disposed in the forward end of the elongated slot. As the support structure pivots to the prone position, the hinge pin slides rearwardly to the rear end of the slot and the pivot arm pivots at the cross support from an upright position to a more rearward, more horizontal position.

BRIEF DESCRIPTION OF THE DRAWINGS

The present invention will be more fully understood by reference to the following detailed description, when read in conjunction with the accompanying drawings in which like reference characters refer to like parts throughout the several views and in which.

DETAILED DESCRIPTION OF THE PREFERRED EMBODIMENT

Figure 1:
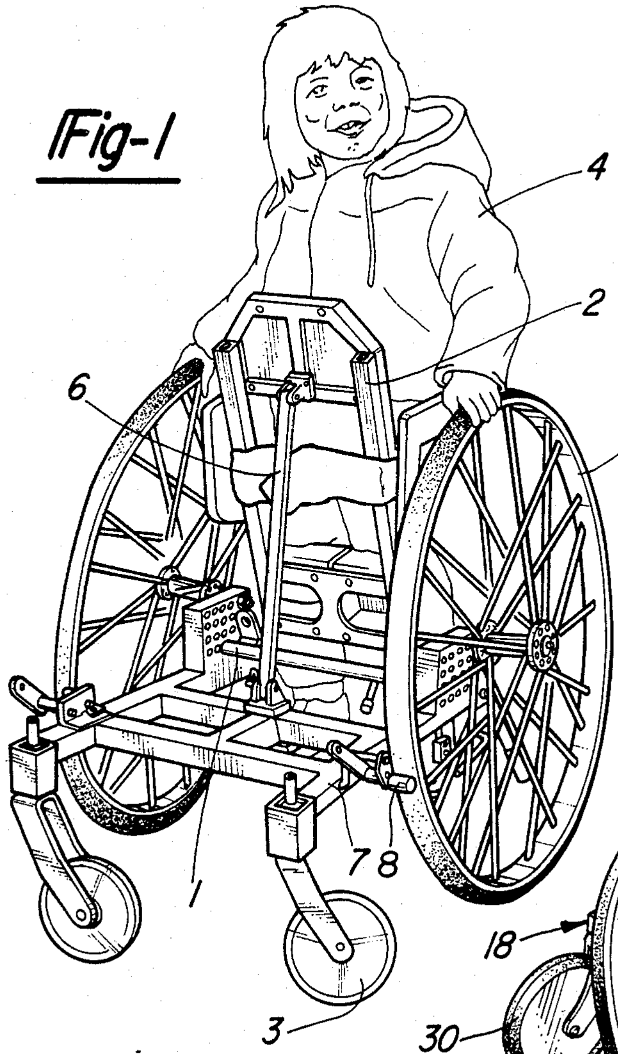
FIG. 1 is a perspective view of an alternate embodiment

Referring first to FIG. 1, a first embodiment of the wheelstand according to the present invention is shown. In this embodiment a brake assembly 8 is shown engaged in a braking mode with a wheel 5, the wheel 5 being attached to a frame 7. This embodiment also illustrates a pivot point 1, a passenger support structure 2 carrying a passenger 4, whereby the passenger support structure 2 is pivotally attached to the frame 7 at the pivot point 1. A locking bar 6 secures the support structure 2 to the frame 7 at a particular angle. A pair of castor wheels 3 are mounted to the frame 7.

Figure 2:
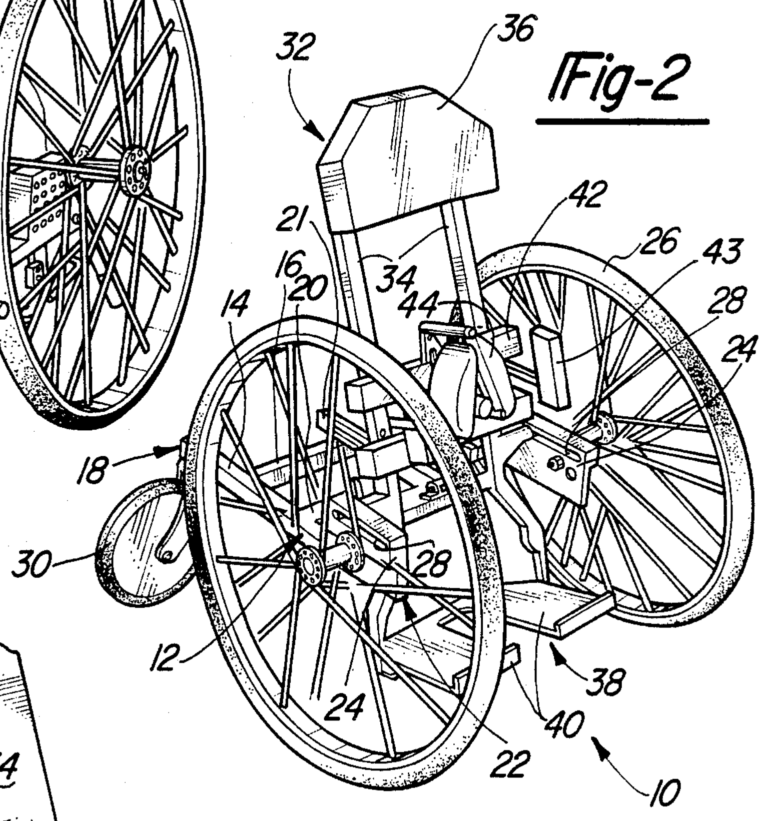
FIG. 2 is a perspective view of a wheelstand according to the present invention.

Referring next to FIG. 2, an alternate embodiment of a wheelstand 10 according to the present invention is thereshown. The wheelstand 10 comprises a frame 12 which may be of tubular or solid construction and includes a pair of elongated lateral supports 14 arranged in spaced, parallel relationship. The frame 12 further includes at least one cross support 16 extending between the lateral supports 14 at the front end 18 of the frame 12. Preferably, an intermediate cross support 20 extends between the lateral supports 14 between the front end 18 and the rear end 22 of the frame 12. At the rear end 22 the lateral supports 14 include an enlarged block portion 24 which extends the frame 12 upwardly and rearwardly from the lateral support 14. The enlarged block portion 24 provides a place for the rotatable attachment of two large diameter drive wheels 26 which preferably are lightweight, spoked wheels. Alternatively, the wheels may be disks to prevent fingers from being caught (not shown), or may be spoked with peripheral finger protection in the form of a cover over the endmost portions of the spokes (not shown). The enlarged block portion 24 also includes an elongated slot 28 for a purpose to be subsequently described.

At the front end 18 of the frame 12 a pair of castor wheels 30 extend from the lateral support 14. The castor wheels 30 and the drive wheels 26 are attached to the frame 12 so that the lateral supports 14 are substantially parallel to a ground surface (not shown) which supports the wheels of the wheelstand 10. The castor wheels 30 are pivotably secured to the lateral supports 14 so as to permit turning of the wheelstand 10.

Figure 3:
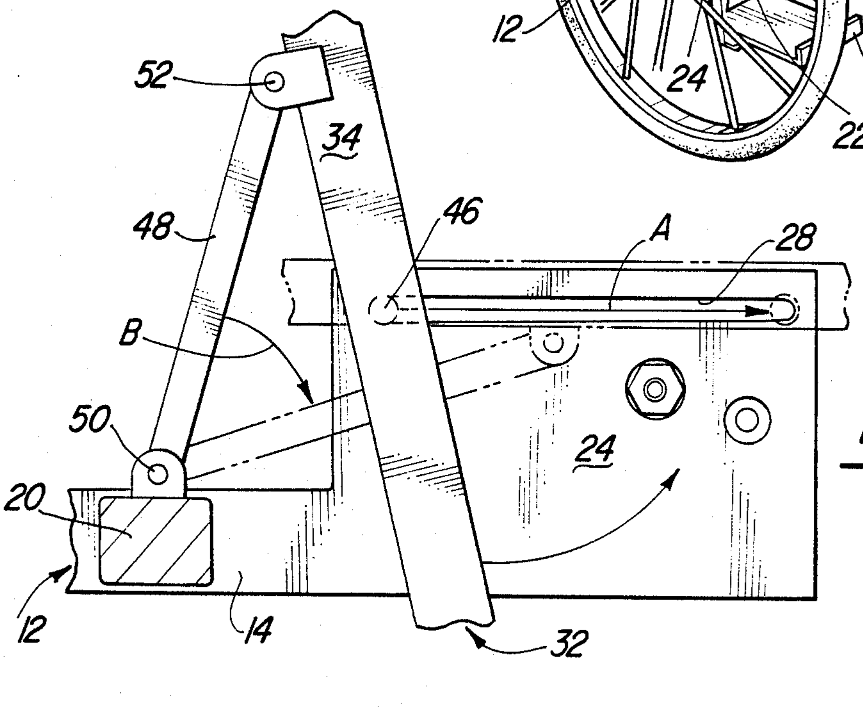
FIG. 3 is a side view of the user support pivot mechanism, enlarged for clarity.
Figure 4:
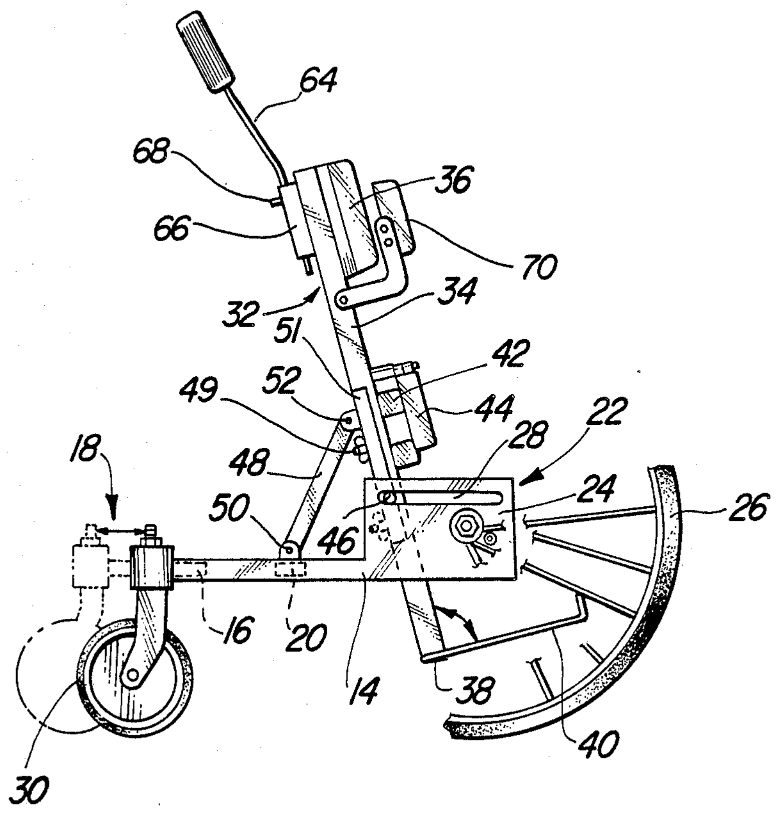
FIG. 4 is a side plan view showing user support structure in an upright position with portions removed for clarity.

Referring now to FIGS. 2, 3 and 4, the wheelstand 10 further comprises a user support structure 32 having a pair of elongated rails 34 in spaced parallel relationship. At the head end of the user support structure 32 a chest plate 36 extends between the elongated rails 34. At the foot end of the user support structure 32 a foot support 38, including two foot plates 40, extends between the elongated rails 34. Intermediate the head and foot ends leg or thigh plates 42 extend between the elongated rails 34. The chest or torso plate 36 and the thigh plate 42 may each be padded as shown in the drawing to enhance user comfort. Moreover, a V-shaped leg pad 44 may be disposed centrally between the elongated rails 34 in a position to extend between the legs of a user of the wheelstand 10. The V-shaped leg pad 44 points away from the foot plates 40 as illustrated in FIG. 2. Additionally, a pair of adjustable adductor pads 43 may be included to provide hip support. A strap or belt (not shown) preferably is used to secure the user to the user support structure 32.

Figure 5:
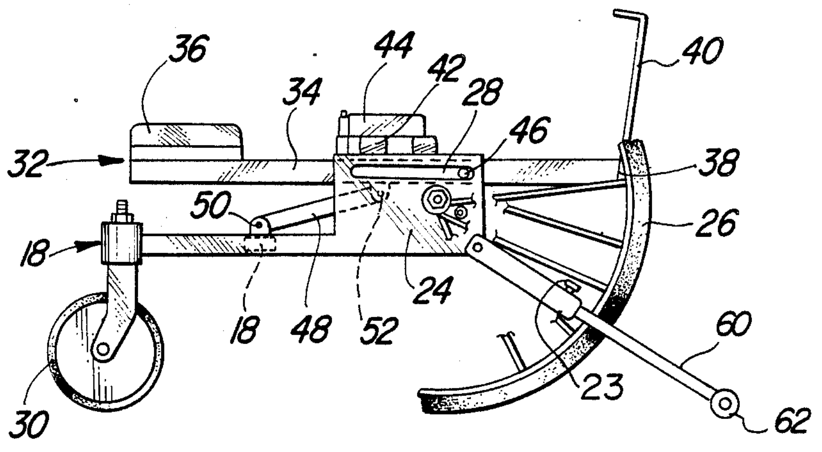
FIG. 5 is a side plan view showing the user support structure in a prone position, with portions removed for clarity.

As best shown in FIG. 3, each of the elongated rails 34 includes a hinge pin 46 extending outwardly from the user support structure 32. The hinge pins 46 are coaxial and are dimensioned to fit in the elongated slots 28 of the block portion 24. The spacing between the enlarged block portions 24 and the elongated rails 34 is such that the hinge pins 46 are entrained within the elongated slots 28. A pivot arm 48 has a first end secured at a pivot point 50 to the frame 12 and preferably to the intermediate cross support 20. A second end of the pivot arm 48 is pivotably attached at pivot point 52 to the elongated rail 34 of the user support structure 32. In the preferred embodiment, two such pivot arms 48 are employed, one associated with each elongated rail 34 and extending to the intermediate cross support 20 at each side near the lateral supports 14. The user support structure 32 pivots from the upright position (shown in FIG. 4 and in solid line in FIG. 3) to the prone position (shown in FIG. 5 and in phantom in FIG. 3). As it does so, the hinge pin 46 slides from the forward end of the elongated slot 28 to the rearward end as indicated by the arrow A in FIG. 3, while the pivot arm 48 moves in the direction of arrow B. Adjustment bar 21 selectively locks the support structure in a variety of positions.

By shifting the user support structure 32 rearwardly as shown by the arrow A in FIG. 3, the tendency of the center of gravity to shift forward upon lowering of the support structure 32 is counteracted. Accordingly, instead of an unstable wheelstand having undue stress placed on its forward castor wheels, the wheelstand 10 of the present invention remains stable due to its ability to maintain the center of gravity distributed over substantially the same location regardless of the position of the user support structure 32.

For example, referring to FIG. 4 and assuming that the center of gravity is located approximately at the tip of the wedge pad 44, it is disposed over the front edge of the enlarged block portion 24. If the user support structure 32 were simply hinged, as in the prior art structures, lowering the support structure to the horizontal position would place the same center of gravity forward of the intermediate cross support 20. However, referring to FIG. 5, the center of gravity at the tip of the wedge 44 is still located above the forward edge of the enlarged block portion 24 when the user support structure 32 is in the horizontal or prone position.

By selecting appropriate lengths for the elongated slot 28 and the pivot arm 48, as well as appropriate pivot points 50 and 52, it is possible to achieve the ideal situation where the center of gravity of the combined user and wheelstand remains always over the ideal location between the front castor wheel 30 and the drive wheel 26, preferably towards the latter. Practically, it does not matter if the center of gravity varies slightly from this ideal location so long as it remains substantially over this preferred location. For this reason, the position of the front castor wheels 30 may be adjustable as shown in phantom in FIG. 4.

Referring back to FIG. 4, the wheelstand of the present invention may be further fitted with options necessary to meet the personal needs of the user, thus underscoring the versatility of design.

For convenience of the user's assistant, the support structure 32 may be removably detachable from the frame 12 by releasing the structure 32 from a pair of lateral support sub-structures 51. Conventional quick-release fasteners 49 are provided to allow removal.

On the side of the support structure 32 approximately opposite the chest plate 36 may be provided a pair of accessory brackets 66. Each of the brackets 66 is provided to accommodate a variety of user accessories, including handles 64 to allow the user to stabilize his upper torso and to allow the user to draw himself toward the wheelstand when mounting the same. Other accessories may include a tray 80 (shown in FIG. 6) for use as a classroom aid and an exercise pad (not shown). The selected accessory may be selectively released from the brackets 66 by means of an accessory release 68 fitted to each of the brackets 66.

In addition, one or more trunk pads 70 may be provided to offer trunk or torso support to the user.

Referring back to FIG. 5, the above-described proper balance of the wheelstand notwithstanding, a pair of adjustable, spring-loaded, telescoping antitippers 60 may be provided. The antitippers, each fitted with one or two antitipper wheels 62, provide added security for the user, particularly when negotiating steps or inclines. The spring-loading of the antitippers 60 also allow the user to accomplish "wheelies", thereby allowing the climbing of curbs. In addition, this characteristic makes the wheelstand more fun, and therefore more desirable to use in various environments by young people. The antitippers 60 may be adjusted by a locking knob 23.

Figure 6:
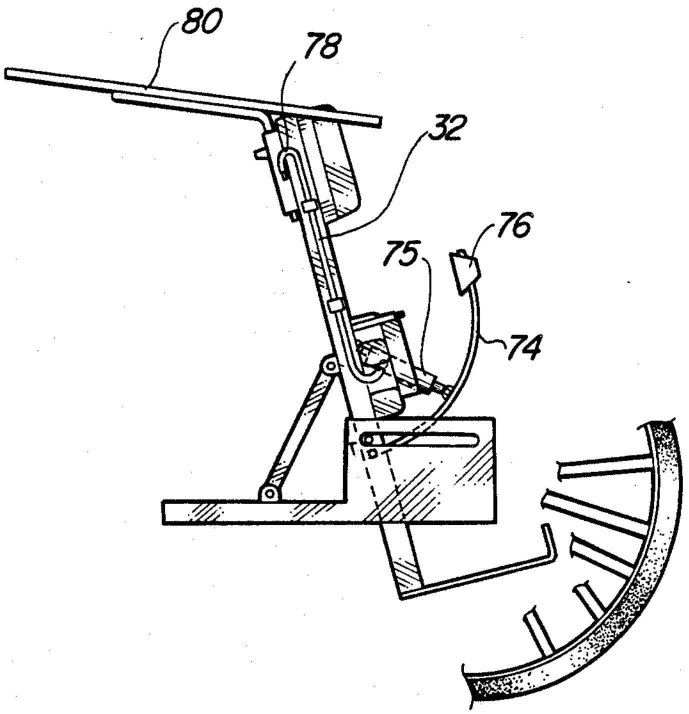
FIG. 6 is an alternate embodiment of the user support structure in an upright position with portions removed for clarity.

With reference to FIG. 6, an additional option is shown to provide the user with back support without the need for assistance from others. According to the prior art described above, a belt or the like is required to hold the user against the support structure 32. However, such a device is not likely convenient to or workable by the user, thus requiring assistance from others. To provide independence to the user, a back support is provided which may be emplaced by the user. A back support pad 76 is provided at an end of a curved back support pad shaft 74. The pad shaft 74 is pivotally attached to the support structure 32 and is drawn toward the user by a spring loaded piston 75. The piston 75 is pivotally mounted at one end to the support structure 32 and at its other end to the shaft 74. A remote back support pad release 78 is provided convenient to the hands of the user. When not in use, the back support pad shaft 74 locks in an open position (not shown). Once the user has mounted himself onto the wheelstand, he operates the release 78 and the pad 76 gently springs into place to urge the user against the structure 32 into the closed position as illustrated.

Figure 7:
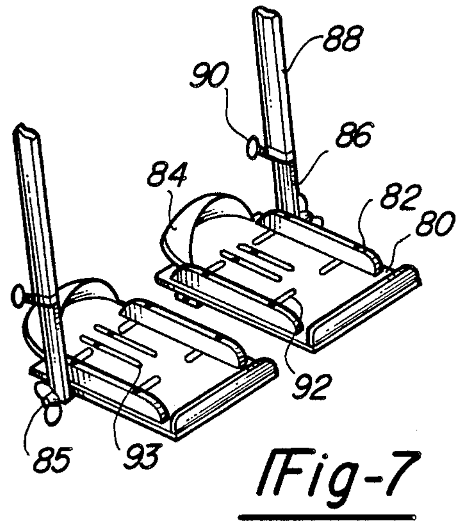
FIG. 7 is a perspective view of optional foot supports for the wheelstand of the present invention.

Referring to FIG. 7, yet a further option is shown relating to the user's feet and legs.

To accommodate legs of different lengths, each adjustable foot plate 80 may be adjusted up or down relative to a user in position on the wheelstand. Such movement is accomplished by a telescoping leg support bar 86 which may be telescoped within the base of the elongated rails 34 according to the embodiment. The bar 86 may be selectively locked into place within housing 88 by means of a conventional tightener 90.

To accommodate feet of different sizes, each adjustable foot plate 80 may be provided with a pair of padded, adjustable lateral supports 82 slidable along adjustable lateral support slots 92. To secure the user's toes, each plate 80 may be further provided with a toe cup 84.

Because the user's feet may be contorted in a variety of positions, the foot plate 80 may be adjusted back and forth relative to the user by sliding the plate 80 along a pair of adjustment slots 93. Furthermore, to more fully accommodate the variable positions of the user's feet, each of the plates 80 may be angled relative to the leg support bar 86 according to adjustment accomplished by altering a foot rest pivotable adjustment mechanism 85.

Figure 8:
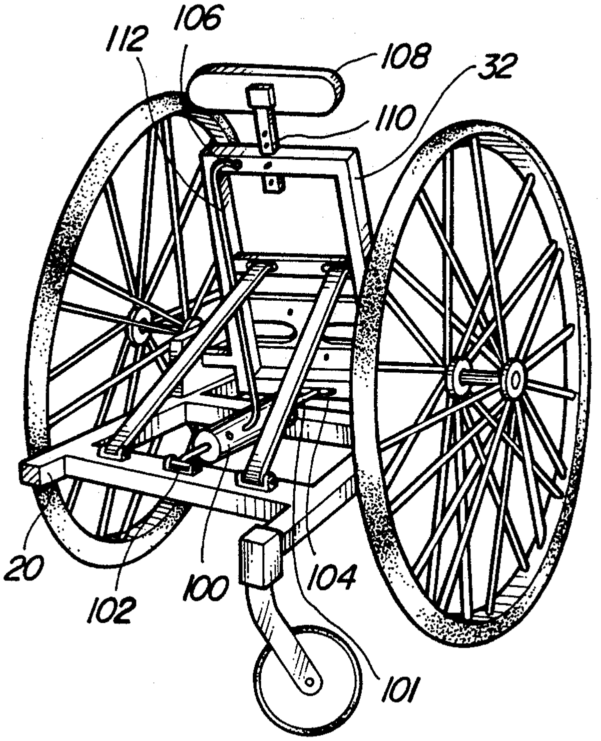
FIG. 8 is a perspective view of an alternate embodiment of a wheelstand according to the present invention detailing the mechanism for lowering the user support structure.

Referring finally to FIG. 8, other options are shown to provide added comfort and convenience to the user. In lieu of the chest plate 36 shown in, for example, FIG. 2, a conventional rest 108 may be used and adjustment of the rest 108 is accomplished by the raising or lowering of the rest 108 by adjusting a rest bar 110.

While the adjustment bar 21 of FIG. 2 allows operation by the assistant, a means is shown and hereafter detailed by which to allow the user structure 32 to be lowered by the user at his selection. This is accomplished by the provision of a spring-loaded pistion 100 pivotally attached to the cross support 20 by a frame bracket 102. A piston rod 101 is pivotally attached to structure 32 by a structure bracket 104. A remote piston release valve 106 is provided convenient to the user, and is fluidly attached to the piston 100 by a remote piston release line 112.

In use, the user, in place on the wheelstand, may selectively wish to lower the structure 32 to a prone position. By operating the valve 106, air is released from the piston 100 and the user may stop the downward motion at any one of an infinite number of positions. To prevent abrupt halting of the structure 32 at the position selected by the user, the piston is spring loaded.

The foregoing detailed description of the structure and operation of the present invention has been given for clearness of understanding only and no unnecessary limitations should be understood therefrom. Some modifications will be obvious to those skilled in the art to which the invention pertains, without deviation from the spirit of the invention as defined by the scope of the appended claims.

I claim:

1. An ambulatory wheelstand for a user having a center of gravity, said wheelstand comprising:

a frame having a pair of elongated, spaced lateral supports and at least one cross support extending between said lateral supports at a front end of said frame;

said frame having a longitudinal axis;

two large diameter drive wheels rotatably attached to said lateral supports towards a rear end of said frame;

at least one castor wheel attached to said frame towards the front end, said wheels being adapted to support said frame above a ground surface;

a user support structure pivotably secured to said frame and movable between at least an upright position, in which said structure is substantially vertical, and a prone position, in which said support is substantially horizontal; and means for pivoting said user support structure so that, regardless of its position, the center of gravity of the user supported by the support structure remains above substantially a single point with respect to said frame;

said means for pivoting including a pivoting member interconnecting said frame and said user support structure; and said means for pivoting further including an elongated groove provided in said frame member and disposed substantially longitudinally, and a hinge pin entrained in said groove, said hinge pin connecting thereby said user support structure and said frame.

2. The wheelstand as defined in claim 1 wherein said user support comprises a pair of spaced elongated rails, said rails being spanned at one end by a chest plate, at another end by a foot support and intermediate said ends, by a thigh plate.

3. The wheelstand as defined in claim 2 wherein said user support structure further comprises a leg pad arranged in a V-shape pointing away from said foot support.

4. The wheelstand as defined in claim 3 wherein said user support structure further comprises one or more axially provided hip adductor pads.

5. The wheelstand as defined in claim 2 wherein said foot support includes a foot plate disposed substantially perpendicularly to a plane defined by said elongated rails.

6. The wheelstand as defined in claim 2 wherein said chest plate is provided with brackets for removably receiving handles having hand grips.

7. The wheelstand as defined in claim 2 wherein said user support structure further includes a back support means for urging said user substantially against said user support frame.

8. The wheelstand as defined in claim 1 wherein said frame is rectangular and said at least one castor wheel comprises two castor wheels disposed one each at the front end of said lateral supports.

9. The wheelstand as defined in claim 8 and further including at least one cantilevered antitipper bar secured to said frame substantially opposite each of said two castor wheels.

10. The wheelstand as defined in claim 9 wherein each of said antitippers includes means for adjusting the length thereof.

11. The wheelstand as defined in claim 1 and comprising a brake mechanism to selectively prevent rotation of said drive wheels.

12. The wheelstand as defined in claim 1 wherein said single point is located between said drive wheels and said at least one castor wheel.

13. The wheelstand as defined in claim 1 wherein said foot support comprises:

- a foot plate for each foot pivotally attached to an attachment shaft, said shaft being slidably disposed within said rail;
- a means for locking said shaft within said rail;
- said plate including a toe cup means for accommodating and securing the toes of the feet of said user;
- said plate having adjustable lateral supports; and
- said plates being adjustable forward or backward relative to said support structure.

14. The wheelstand as defined in claim 1 wherein said user support structure is releasably attachable to said frame.

15. An ambulatory wheelstand for a user having a center of gravity, said wheelstand comprising:

- a frame having a pair of elongated, spaced lateral supports and at least one cross support extending between said lateral supports at a front end of said frame;
- two large diameter drive wheels rotatably attached to said lateral supports towards a rear end of said frame;
- at least one castor wheel attached to said frame towards the front end, said wheels being adapted to support said frame above a ground surface;
- a user support structure pivotably secured to said frame and movable between at least an upright position, in which said structure is substantially vertical, and a prone position, in which said support is substantially horizontal; and
- means for pivoting said user support structure so that, regardless of its position, the center of gravity of the user supported by the support structure remains above substantially a single point with respect to said frame;

said means for pivoting comprising:

- (a) a portion of each of said lateral supports defining an elongated slot therewith, each slot extending substantially parallel to said lateral supports;
- (b) a pair of hinge pins secured coaxially to said user support structure, one of said hinge pins being slidably entrained in each of said slots and movable between at least a front end and a rear end of said slot; and
- (c) at least one pivot arm having a first end pivotably secured to said frame in front of said slots and a second end pivotably secured to said user support structure toward the chest plate end from said hinge pin, wherein said hinge pin is disposed at the front end of said slot when the user support structure is in the upright position and at the rear end of said slot when the user support structure is in said prone position.

16. The wheelstand as defined in claim 5 and comprising locking means for selectively locking said user support structure with respect to said frame against further pivoting.

17. The wheelstand as defined in claim 15 wherein said elongated slot is disposed in a block portion at the rear end of said lateral supports so that the elongated slot is disposed above a point where said first end of said pivot arm is secured to said frame.

18. The wheelstand as defined in claim 15 wherein said first end of said pivot arm is secured to said frame at a cross support intermediate said front and rear ends of said frame.

19. The wheelstand as defined in claim 15 and comprising a spring-loaded piston means, said means including:

- at least one spring-loaded piston body having a first and a second end pivotally secured to said frame;
- a shaft having two ends provided for each of said at least one piston body slidably insertable into said body at said shaft's second end and pivotally secured to said support structure;
- one or more fluid lines fluidly attached to each of said at least one piston body; and
- at least one user control valve provided within reach of said user on said wheelstand and fluidly attached to said one or more fluid lines.

20. An ambulatory wheelstand for a user having a center of gravity, said wheelstand comprising:

- a frame having a pair of elongated, spaced lateral supports and at least one cross support extending between said lateral supports at a front end of said frame;
- two large diameter drive wheels rotatably attached to said lateral supports towards a rear end of said frame;

at least one castor wheel attached to said frame towards the front end, said wheels being adapted to support said frame above a ground surface;

a user support structure pivotably secured to said frame and movable between at least an upright position, in which said structure is substantially vertical, and a prone position, in which said support is substantially horizontal;

means for pivoting said user support structure so that, regardless of its position, the center of gravity of the user supported by the support structure remains above subtantially a single point with respect to said frame;

said user support comprising a pair of spaced elongated rails, said rails being spanned at one end by a chest plate, at another end by a foot support and intermediate said ends, by a thigh plate;

said user support structure further including a back support means for urging said user substantially against said user support frame; and said back support means comprising:

(a) a curved shaft having a first end and a second end;

(b) one or more back support pads fixed to said first end of said shaft; p1 (c) said second end of said shaft being pivotally attached to said frame;

(d) a spring loaded piston having a first end and a second end;

(e) said first end of said piston being pivotally attached to said shaft; and (f) said second end of said piston being pivotally attached to said frame.

* * * * *